United States Patent Office 3,705,016
Patented Dec. 5, 1972

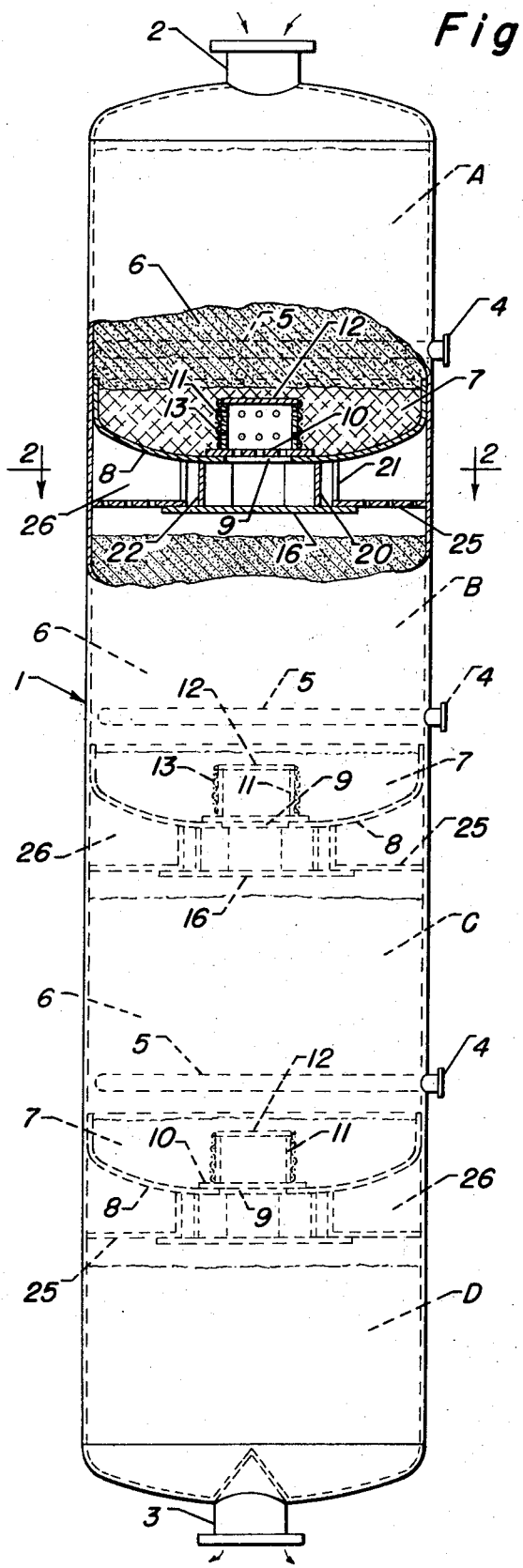
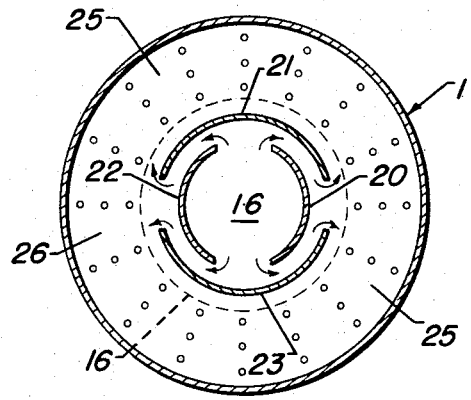
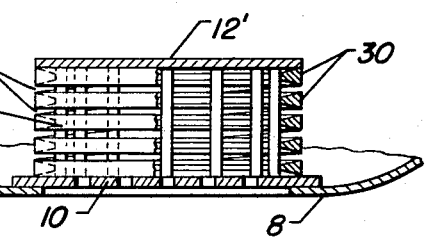

3,705,016
FLUID-SOLIDS CONTACTING CHAMBER
Orville I. Ludwigsen, Prospect Heights, and Daniel Dudych, Des Plaines, Ill., assignors to Universal Oil Products Company, Des Plaines, Ill.
Filed Nov. 20, 1970, Ser. No. 92,037
Int. Cl. B01j 9/04
U.S. Cl. 23—283    3 Claims

ABSTRACT OF THE DISCLOSURE

An apparatus for contacting a fluid in a fluid-solid contacting zone such as an adsorption zone or a reaction zone. The apparatus is comprised of an elongated chamber having a horizontally positioned imperforate plate with a centrally disposed opening therein for holding and retaining an upper bed of particulated contact solids. A fluid introduction means such as a perforate conduit extends from centrally disposed opening into the upper bed of contact solids. Spaced below the opening is a second horizontally positioned imperforate plate and vertical baffle means interposed between the first horizontally positioned imperforate plate and the second imperforate plate. A horizontally positioned perforated plate means is spaced below the imperforate plate means.

---

The present invention relates to an apparatus for contacting a fluid with a solid particulate in a contacting zone such as an adsorption zone or a reaction zone. More particularly, the invention relates to a new apparatus for contacting a fluid with a solid particulate having an improved redistributor means for uniformly distributing mixed phases of vapor and liquid to a granular or particulated solid contacting zone.

Among the most important of the various commercial processes are those involved with the physical or chemical treatment of hydrocarbons and other organic materials with bodies of granular or particulated solid contact materials. Many of these processes involve the contacting of fluids with the contacting material, and often the fluids will comprise a liquid phase and a gas or vapor phase. It has been the experience in the art, that the introduction of such mixtures of liquid and vapor into a bed of particulated contact solids in a uniformly distributed manner is difficult to achieve.

Typical of the art wherein uniform distribution of liquid and gas phases are necessary but infrequently achieved, is that of catalytic hydrotreating and catalytic hydrocracking of various hydrocarbon oils. It is well known that the feed to such a reaction zone comprises liquid hydrocarbon, vaporized hydrocarbon in a hydrogen-rich gas, and that this feed is introduced into the reaction zone at an elevated temperature. It is further known that the reactions which are encountered in this catalytic environment are exothermic, and that the temperature of the vapor phase and of the liquid hydrocarbon phase is increased due to the exothermic heat of reaction. In order to avoid excessive temperature within the catalyst bed it is, therefore, typical to arrange the catalyst in separate fixed beds so that diluent or quench vapors may be distributed between the beds during the reaction. Cool quench vapors, normally comprising hydrogen-rich gas, reduce the temperature of the effluent from the bed above before the liquid-vapor mixture of hydrocarbon and hydrogen is fed into the bed of catalyst below. It is typical in the art to support each individual bed of catalyst upon a perforated support plate. It is also typical in the art to introduce quench hydrogen between the fixed bed of catalyst or at the lower end of the fixed bed of catalyst by means of a perforated pipe grid or other means which is positioned throughout the cross section of the reactor vessel at such a quench point. The effluent from the catalyst bed above, thus rains down from the perforated support plate throughout the cross-sectional area of the reactor. The quench hydrogen is distributed by the perforated grid throughout the cross-sectional area of the reactor.

This prior art type of fluid distributing apparatus comprising a perforated catalyst support plate and a hydrogen quench grid distributor is utilized with the intent of achieving a complete distribution of liquid and gas phases as uniformly as possible throughout the cross-sectional area of the reactor vessel and of the catalyst bed below. However, this typical prior art design has proven to be relatively ineffective in accomplishing this objective. The problem is complicated by the fact that there is a mixed-phase condition within the reactor itself. There is evidence that the heavier viscous liquids tend to channel down the side of the reactor whereas the less viscous liquids tend to channel in the central region of the catalyst bed with the vaporized hydrocarbon and hydrogen. The result is that the temperature encountered within the catalyst bed will be quite uneven and localized undesirable hot spots are often found in each bed. It is well known by those skilled in the art that the existence of the hot spots within the catalyst bed leads to indiscriminate or non-selective hydrocracking of the hydrocarbon constituents, which is an undesirable result.

Since the more viscous liquids tend to rain down through the support plate near the walls of the reactor, these viscous materials will also continue to channel along the walls in the beds below. This results in an ineffective quench within the reactor, and the resulting continuation of liquid channeling produces further danger of localized hot spots in the lower catalyst beds.

Thus, it is a principal object of the present invention to provide an improved apparatus for contacting fluids in a fluid-solids contacting zone such as an adsorption zone or a reaction zone.

It is another object of this invention to provide an improved apparatus for contacting and distributing mixed phases of vapor in liquid in such contacting zones.

It is a further object of this invention to provide for an apparatus for contacting and distributing mixed phases of vapor and liquid in such contacting zones having fluid distribution means whereby a greatly improved mixture of vapor and liquid phases occurs at the point of introduction into a solid contacting zone.

These and other objectives and the advantages of the present invention will become more readily apparent to those skilled in the art as the summary of the invention is more fully set forth hereinafter.

Broadly, the present invention provides for a fluid-solids contacting chamber containing at least two beds of particulated contact solids which comprises in combination: a vertically elongated chamber having at least one upper fluid port means and one lower fluid port means for providing a generally vertical flow of fluid therethrough; a first horizontally positioned imperforate plate having a centrally disposed opening therein for holding and retaining an upper bed of particulated contact solids thereabove; fluid introduction means extending from said centrally disposed opening into the upper bed of particulated contact solids for introducing said fluid flow from the upper bed of particulated contact solids through said opening; fluid distribution means spaced directly below said centrally disposed opening for laterally distributing fluid flow from said opening; and, a horizontally positioned perforated plate means spaced below said imperforate plate means for redistributing the lateral fluid flow downward to a lower bed of particulated contact solids.

In this present invention it is noted that the support by catalyst bed is of an imperforate plate in contradistinction to the typical prior art catalyst support device which employs a perforate plate. This particular feature will enhance the mechanical strength of the support itself. Fluid communication between beds is accomplished through the opening in the central region of this imperforate plate means. A conduit having perforate means extending from the centrally disposed opening into the upper bed will generally serve as fluid introduction means to this opening. Preferably, the first horizontally positioned imperforate plate slopes radially downward toward the centrally disposed opening to establish a flow of fluid radially inwards toward the opening. This feature is especially advantageous in light of the fact that the more viscous liquids tend to localize near the periphery of a chamber and a radially downward sloping imperforate plate will aid in guiding these viscous liquids toward the opening in the central region of the plate. A second horizontally imperforate plate is spaced directly below the centrally disposed opening and vertical baffle means interposed between the first horizontally positioned imperforate plate and the second imperforate plate may serve as the fluid distribution means for distributing fluid flow coming from the opening laterally over the horizontally positioned perforated plate means.

The design and the construction of the present apparatus, as well as other advantageous features in connection therewith, are better set forth and explained by reference to the accompanying diagrammatic drawing and the following description thereof.

FIG. 1 shows a partially cut-away elevational view of a hydrocracking reactor vessel.

FIG. 2 is a cross-sectional view of the embodiment of FIG. 1 as taken along section line 2—2 of FIG. 1.

FIG. 3 is an alternative embodiment of a fluid introduction means that may be utilized in the present invention.

As noted hereinabove, one particularly preferred embodiment wherein the present invention finds application is in exothermic hydrocarbon conversion processing. For illustrative purposes, the FIGS. 1 and 2 show one embodiment of the invention wherein a hydrocarbon fraction is hydrocracked in the presence of hydrogen over a suitable hydrocracking catalyst.

Referring now in more detail to FIGS. 1 and 2 of the drawing, there is shown the hydrocracking reactor vessel comprising a vertically elongated shell 1 having a fluid inlet nozzle or port means 2 at the top of the shell and a fluid outlet nozzle or port means 3 at the bottom of the shell. Reactor vessel 1 contains four catalyst beds, beds A through D, and at the lower end of each of the upper three catalyst beds there is provided a hydrogen quench nozzle 4. This nozzle of course will be supplied with a quench hydrogen and terminates within the vessel 1 by means of the perforated pipe or grid system 5 or other suitable means. The particular location of the quench nozzle and grid system is not within the scope of this present improvement and in fact may be located between adjacent catalyst beds.

The catalyst beds contain a typical hydrocracking catalyst which may be present in pilled, spherical, or extruded form. The particulated catalyst particles 6 are supported in this particular embodiment upon a layer of inert support material 7. The support material 7 may comprise ceramic balls, Burrough Saddles, Raschig Rings, or any other inert packing material which is typically used within hydrocarbon conversion reactors for supporting beds of particulated catalyst. In addition, each bed may contain a similar layer of inert material at the top of catalyst particles. When such is the case, this upper layer of inert support material is used as a means for holding down particles of catalyst 6 in the case of pressure fluctuations, and for enhancing distribution of fluids which enter at the top of each bed.

Each entire catalyst bed comprising catalyst particles 6 and support layer 7 is supported upon a first horizontally positioned imperforate support plate 8 which has a centrally disposed opening 9 therein and which is the initial element of the redistributor. Associated with opening 9 is an optional stabilizer perforated plate 10 spanning the opening.

It is to be noted that preferably the imperforate plate 8 slopes radially downward toward the centrally disposed opening 9. This radially downward slope helps guide the more viscous fluids radially inwards toward opening 9. Fluid introduction means in the form of a conduit 11 having perforations therein extends from the centrally disposed opening 9 into each of the upper beds for introducing fluid flow from the upper beds through the opening 9. In this embodiment conduit 11 is capped with an imperforate plate 12, and screening 13 is provided around the periphery of coduit 11 to prevent the perforations therein from clogging with catalyst or inert material.

As an alternate to the conduit of FIG. 1, a conduit 11' form having a continuous wedge or V-shaped slot is contemplated to serve the purpose of the fluid introduction means as is illustrated in FIG. 3 of the drawing. The continuous slot conduit 11' comprises a continuous wedge-shaped wire 30 that has been wound in a helical manner to form resulting V-slots 31 of increasing cross-sectional area in the inward radial direction. Such a continuous slot conduit has the advantage of being self-cleaning or non-clogging and has a very high screening efficiency. Conduit 11' is capped with an imperforate plate 12'.

Referring again to FIGS. 1 and 2 of the drawing, it is seen that spaced below the opening 9 there is provided a second imperforate plate 16. Interposed between the first horizontally positioned imperforate plate 8 and the second imperforate plate 16 are baffling means comprising a series of vertical baffle plates 20 through 23. In this preferred embodiment the baffle plates are arranged to mix and redistribute the fluid flow laterally. A horizontally positioned perforate plate 25 is spaced below the first imperforate plate 8 and thus a generally annularly shaped manifold 26 results thereabove. The fluid flow issuing from the baffle plates is distributed into this manifold 26 and consequently is allowed to rain through the perforations in the perforated plate 25.

In the typical hydrocracking process, a feed comprising liquid hydrocarbon, vaporized hydrocarbon, and a hydrogen-rich gas enters the vessel 1 via inlet port means 2. This feed mixture passes through the first catalyst bed A and is increased in temperature due to the hydrocracking reaction which occurs therein. As the feed and the resulting effluent pass through catalyst bed A, the vapor portion will typically tend to flow down the central region of the catalyst bed while the liquid portion will tend to channel down the reactor walls and along the outer periphery of the bed. Toward the lower end of bed A the hydrogen quench is injected into the bed through nozzle 4 and the grid system 5. The mixture now reaches the inert material 7. Because of the particular shape of this section of the reactor vessel, the liquid portions of the effluent will flow toward the perforated walls of conduit 11. Also, since the top of conduit 11 has an imperforate plate 12 thereon, the portion of the effluent flowing through the central regions of the reactor will be directed around the top of conduit 11 to be intermixed with the liquid portions of the effluent within the inert material. The total mixture of hot effluent eventually passes through the perforations of conduit 11 down through the opening 9 of imperforate plate 8 to impinge upon plate 16. The mixture is now passed through the baffling means as indicated by the arrows in FIG. 2 of the drawing to be discharged into the annular space 26 and consequently through perforations and perforate plate 25 to pass into catalyst B below in a substantially uniformly distributed pattern at a substantially uniform temperature. The particular arrangement of the redistributor formed by imperforate plates 8 and 25, conduit 11 as well as the baffles 21 to 23 and plate 25 serves to greatly improve the mixing of the effluent and serves to introduce said effluent into the lower bed B in a substantially uniform manner. The effluent hydrocarbon from bed A reacts with the hydrogen on the catalyst of bed B, and exothermic heat of reaction is generated. The effluent near the lower end of bed B is thus elevated in temperature and again is hydrogen quenched. It then is passed and mixed through conduit 11, impinges imperforate plate 16, flows through baffle means comprising plates 20 through 23, through the annular space 26, and down through the perforated plate 25 to rain in a substantially uniformly distributed pattern into bed C where further exothermic hydrocracking occurs. The resulting effluent is quenched with additional cool hydrogen and is distributed through bed D in a like manner as through beds B and C. Further hydrocracking of hydrocarbon constituents occurs in bed D. The final effluent then leaves catalyst bed D and the reactor vessel 1 via the outlet port means 3 for separation processing in a manner that is well known by those skilled in the art.

From the foregoing description it is readily seen that the apparatus of this invention has a redistributing means that will mix and redistribute the effluent in an improved manner. The redistributor will through its unique structural arrangement combine and mix the viscous liquids that tend to channel down the sides of the reactor with the less viscous liquids and vapors that tend to channel in the central region of the reactor to redistribute them uniformly into a subsequent lower bed within the reactor. The result is that the tendency of hot spots to develop in prior art reactors will be minimized, which will greatly improve the efficiency of the reactor itself.

The manner of operation of this apparatus is readily ascertainable to those skilled in the art from the teachings that have been presented hereinabove, and the advantages to be accrued from the inventive device are equally apparent. It must be realized, however, that the effectiveness of the device will depend upon the specific environment in which it is utilized, and in the specific dimensional design of distributing portion of the apparatus as it is specifically employed. The dimensions for the apparatus and its many elements cannot be set forth herein with great detail since a great many factors will affect the dimensions which are required in any specific environment. Among the factors to consider in a hydrocracking reactor, for example, are the rate of flow of the effluent from the catalyst bed above to the bed below, and the rate of flow of the quench hydrogen. The vapor-liquid distribution of the effluent flowing from the bed above will also affect the dimensions of the apparatus, and the temperature and pressure of the effluent will have a pronounced effect upon the system and especially upon the design of the imperforate plate means 8. It will be apparent to those skilled in the art that the number of fluid openings which are provided in the perforate members such as plates 25, 10, and conduit 11 will vary with the specific application. Primarily, the pressure drop across plate 8 must be considered in establishing the number of perforations in a size of conduit 11 as well as the size of opening 9.

While the embodiment disclosed hereinabove has been directed to the catalytic reaction of hydrocarbons in a hydrogen atmosphere, the invention is not so limited. Those skilled in the art will perceive that the method of contacting a fluid in a fluid-solid contacting zone and the apparatus therefore have equal application in any fluid-solid contacting zone such as in adsorption zones as well as reaction zones.

We claim as our invention:

1. A fluid-solids contacting chamber containing at least two beds of particulated contact solids which comprises in combination:
   (a) a vertically elongated chamber having at least one upper fluid port means and one lower fluid port means for providing a generally vertical flow of fluid therethrough;
   (b) a horizontally positioned imperforate plate means having a centrally disposed opening therein for holding and retaining an upper bed of particulated contact solids thereabove;
   (c) fluid introduction means extending from said centrally disposed opening into the upper bed of particulated contact solids for introducing said fluid flow from the upper bed of particulated contact solids through said opening;
   (d) fluid distribution means spaced directly below said centrally disposed opening for laterally distributing fluid flow coming from said opening; and,
   (e) a horizontally positioned perforate plate means having perforations around the periphery thereof spaced below said imperforate plate means, said perforations being adapted to redistribute the fluid flow downward to a lower bed of particulated contact solids, and,
   (f) said horizontally positioned imperforate plate means being sloped radially downward toward the centrally disposed opening thereof, whereby the downward flow of fluid is directed radially inwards toward said opening.

2. The chamber of claim 1 further characterized in that said fluid introduction means comprises a conduit having perforate means for permitting fluid flow therethrough.

3. The chamber of claim 1 further characterized in that said fluid distribution means includes an additional imperforate plate spaced directly below the centrally disposed opening and vertical baffle means is interposed between the horizontally positioned additional imperforate plate means and said imperforate plate for baffling the lateral fluid flow over the horizontal positioned perforate plate means.

References Cited

UNITED STATES PATENTS 3,433,600    3/1969    Christensen et al. ____ 23—288 R
3,378,349    4/1968    Shirk _____ 23—288 R JAMES H. TAYMAN, JR., Primary Examiner U.S. Cl. X.R.

23—288 R; 208—146; 261—113; 23—1 E